April 9, 1946.    F. E. ALTMAN    2,398,276
VARIABLE POWER TELESCOPE
Filed Feb. 5, 1945    2 Sheets-Sheet 1

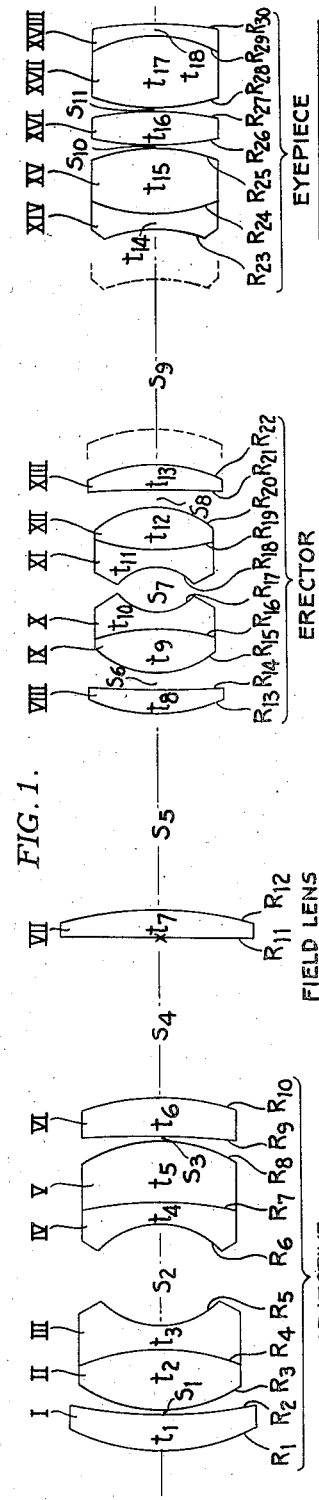

FIG.1.

TABLE 1 - OBJECTIVE    EF = 157.6 mm.    f/4.5

| LENS | N | V | RADII | | THICKNESSES | |
|---|---|---|---|---|---|---|
| I | 1.745 | 46.4 | $R_1$ = + 48.4 m | | $t_1$ = 9.1 mm. | |
| | | | $R_2$ = + 97.5 | | $s_1$ = 1.6 | |
| II | 1.620 | 60.3 | $R_3$ = + 37.0 | | $t_2$ = 15.1 | |
| III | 1.617 | 36.6 | $R_4$ = − 58.7 | | $t_3$ = 6.2 | |
| | | | $R_5$ = + 21.1 | | $s_2$ = 26.3 | |
| IV | 1.617 | 36.6 | $R_6$ = − 21.1 | | $t_4$ = 6.2 | |
| V | 1.611 | 57.2 | $R_7$ = − 92.6 | | $t_5$ = 15.1 | |
| | | | $R_8$ = − 36.4 | | $s_3$ = 1.0 | |
| VI | 1.745 | 46.4 | $R_9$ = − 225.6 | | $t_6$ = 9.1 | |
| | | | $R_{10}$ = − 65.5 | | $s_4$ = 81.8 | |

TABLE 2 - FIELD LENS    EF = 95.5 mm.

| LENS | N | V | RADII | | THICKNESSES | |
|---|---|---|---|---|---|---|
| VII | 1.523 | 58.6 | $R_{11}$ = ∞ | | $t_7$ = 7.5 | |
| | | | $R_{12}$ = − 50.0 | | $s_5$ = 92.6 | |

TABLE 3 - ERECTOR    EF = 110.8 mm.

| LENS | N | V | RADII | | THICKNESSES | |
|---|---|---|---|---|---|---|
| VIII | 1.611 | 57.2 | $R_{13}$ = + 47.3 mm. | | $t_8$ = 8.3 mm. | |
| | | | $R_{14}$ = + 465.0 | | $s_6$ = 3.1 | |
| IX | 1.617 | 55.0 | $R_{15}$ = + 28.4 | | $t_9$ = 13.9 | |
| X | 1.617 | 36.6 | $R_{16}$ = − 63.4 | | $t_{10}$ = 5.4 | |
| | | | $R_{17}$ = + 15.5 | | $s_7$ = 14.4 | |
| XI | 1.617 | 36.6 | $R_{18}$ = − 15.5 | | $t_{11}$ = 5.4 | |
| XII | 1.617 | 55.0 | $R_{19}$ = + 63.4 | | $t_{12}$ = 13.9 | |
| | | | $R_{20}$ = − 28.4 | | $s_8$ = 7.4 | |
| XIII | 1.611 | 57.4 | $R_{21}$ = − 465.0 | | $t_{13}$ = 8.3 | |
| | | | $R_{22}$ = − 47.3 | | $s_9$ = 421.0 | |

TABLE 4 - EYEPIECE    EF = 36.8 mm.

| LENS | N | V | RADII | | THICKNESSES | |
|---|---|---|---|---|---|---|
| XIV | 1.720 | 29.3 | $R_{23}$ = − 46.2 mm. | | $t_{14}$ = 4.5 mm. | |
| XV | 1.697 | 56.1 | $R_{24}$ = + 52.2 | | $t_{15}$ = 24.0 | |
| | | | $R_{25}$ = − 55.5 | | $s_{10}$ = 0.2 | |
| XVI | 1.611 | 58.8 | $R_{26}$ = + 125.8 | | $t_{16}$ = 10.5 | |
| | | | $R_{27}$ = − 125.8 | | $s_{11}$ = 0.2 | |
| XVII | 1.697 | 56.1 | $R_{28}$ = + 80.0 | | $t_{17}$ = 22.5 | |
| XVIII | 1.720 | 29.3 | $R_{29}$ = − 40.5 | | $t_{18}$ = 4.0 | |
| | | | $R_{30}$ = − 124.8 | | | |

FRED E. ALTMAN
INVENTOR
BY
ATTY & AG'T

April 9, 1946.   F. E. ALTMAN   2,398,276
VARIABLE POWER TELESCOPE
Filed Feb. 5, 1945   2 Sheets-Sheet 2

FRED E. ALTMAN
INVENTOR

Patented Apr. 9, 1946

2,398,276

UNITED STATES PATENT OFFICE 2,398,276

VARIABLE POWER TELESCOPE

Fred E. Altman, Rochester, N. Y., assignor to Eastman Kodak Company, Rochester, N. Y., a corporation of New Jersey Application February 5, 1945, Serial No. 576,279

5 Claims. (Cl. 88—32)

This invention relates to telescopes having variable power.

There are at least three classes of telescopes of non-uniform magnifying power.

(1) Variable power telescopes in which one or more lenses are movable in an axial direction to change the power.

(2) Selective power telescopes in which lenses may be removed from and inserted into the path of the light.

(3) Bull's-eye telescopes having a high magnification at the center of the field of view, and a lower magnification in the peripheral portion.

Of course features may be combined in one instrument by which it belongs to two or three of these classes at the same time.

The present invention relates entirely to the first class, which in turn has two subclasses:

(1a) Dual power telescopes in which a lens or lenses are used in either extreme position to which it or they are adapted to be moved, giving a choice of two magnifications, but are out of focus in the intermediate positions, and (1b) Continuously variable power telescopes which are provided with cams moving two lenses or lens groups in coordinated manner so as to maintain an acceptably sharp focus throughout the range of motion.

These two subclasses differ mainly in the manner of mounting of the lenses, rather than optically. However, the optical requirements of design are considered more severe in the continuously variable power than in the dual power.

The object of the present invention is to provide a superior optical system for telescopes of continuously variable power and also suitable for those of dual power. Even the best prior variable power telescopes gave definitely inferior definition when used at one of their intermediate magnifications. The present invention provides a telescope with exceptionally fine quality throughout the range of magnifications.

Variable power telescopes are one class of sighting devices and as a rule they comprise an objective, an erector or relay lens, and an eyepiece. The erector is simply a second objective working at finite conjugates. It relays the image along the optical tube and at the same time erects the inverted image formed by the first objective, hence it is sometimes called an erector and sometimes a relay objective. The system may have additional relay lenses, prisms, and filters, and usually has field lenses substantially in the image planes.

Heretofore variable power telescopes have suffered from such great drawbacks as to discourage their use in many instances. Besides suffering from all the aberrations of fixed focus telescopes such as astigmatism, curvature of field, secondary color, and spherochromatism, these aberrations as well as the primary spherical aberration and coma varied with the magnification, so that a telescope which had tolerable aberrations at one magnification became intolerable as the magnification was changed.

According to the present invention, a telescope of variable power is made up embodying the principle and features described in my copending application, Serial No. 511,062, filed November 20, 1943, on Sighting devices. In addition I was able to eliminate coma in the instrument as a whole by introducing a slight dissymmetry in the erector so that it had no coma at the high power end of the range and had the same direction of coma at low power as the small residual in the eyepiece so that there is a balancing out of this aberration rather than the case where these transverse errors are additive. A gratifying thing in the present case is that this not only gave improved quality at one magnification (as might be expected from the teaching in that copending case) but the improvement is of a peculiarly stable type. The variations with magnification either are also reduced or tend to counteract each other, and the net result is uniformly acceptable definition at all magnifications in the range used.

Sighting devices, as described in my copending application, comprise an image-forming system and an image-viewing system, and for clarity it is here pointed out that the erector of a variable power telescope would belong to the image-forming system according to the convention adopted therein. The same convention will be adopted in the present specification.

According to the present invention, a variable power telescope is made up in which the image-forming system has an over-corrected Petzval sum substantially cancelling the undercorrected Petzval sum of the image-viewing system. Also the curvatures of the sagittal and tangential fields substantially match those of the image-viewing system. This arrangement was first computed to give improved quality at the highest magnification and the residual aberrations at lowest magnification were calculated and studied. Contrary to experience with previous designs of variable power systems, the image quality at low magnifications was very good, in fact it was at least equal to that at high magnifications, and the corrections were so stable that high quality was maintained throughout the whole range. Obviously this invention terminates the need for several fixed power telescopes to cover an ordinary range of magnifications. The present invention does that with a single instrument and good quality at all settings.

In the accompanying drawings:

Fig. 1 shows a variable power telescope adjusted for 8X power, and with dotted lines indicating the 4X adjustment.

Figure 2:
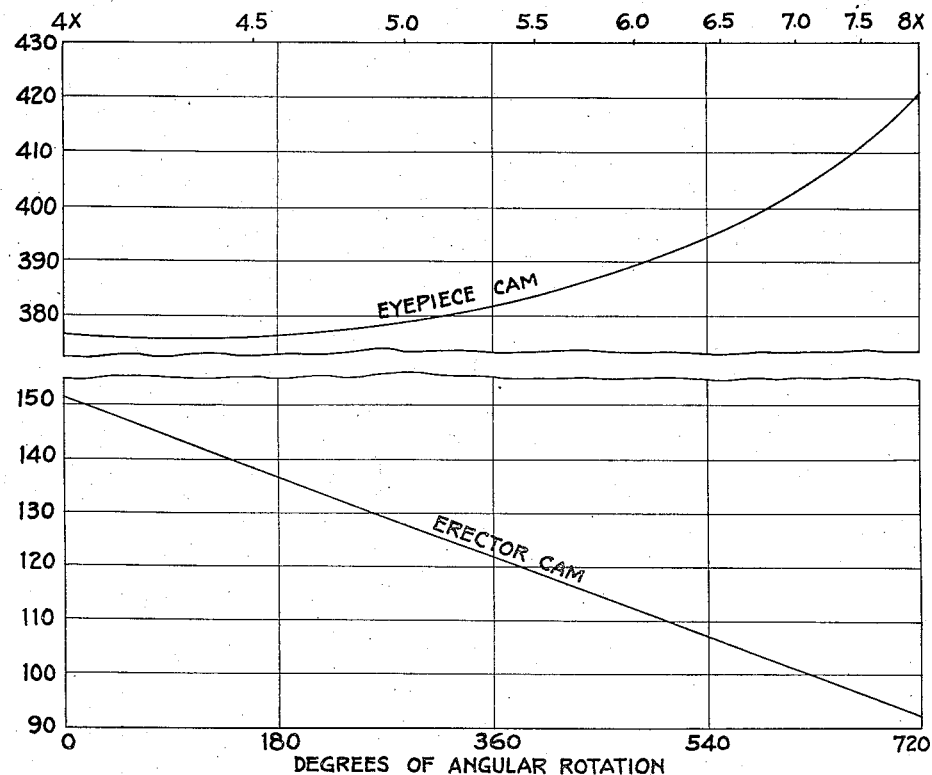
Fig. 2 is a graph showing the relative movement of the erector and of the eyepiece.

After the telescope shown in Figs. 8, 9, 10, and 11 of my application already mentioned had been accepted for use in a particular instrument of war, it appeared that a higher power than 3X would be desirable under certain conditions. A 5X telescope was developed along similar lines. However, no one could decide (without an almost infinite series of trials under practical conditions) as to exactly what magnification would be the most useful. It was therefore suggested that a continuously variable telescope be developed with a range from 4X to 8X power, in order to simplify such trials for determining the optimum magnification. It was even hoped that the users could put up with the expected drawbacks that variable power had always involved, and for this reason might adopt the trial instrument as the final answer.

It was decided to use the same type of eyepiece as had proven so successful in previous telescopes. This is a preferred form of the eyepieces described in more detail in another copending application on "Eyepieces," Serial No. 511,061, also filed November 20, 1943. Variable telescopes having simpler eyepieces and covering a narrower field also are benefited by the incorporation of my invention. However, for the present purposes, the widest possible angular field is essential.

The eyepiece design adopted in this example, then, consists of three positive components of which the center one is a simple convex element, the one nearest the eye is a cemented doublet with its more strongly curved bounding surface facing the center component, and the one nearest the focal plane is a meniscus doublet convex toward the center component. Each of the two doublets consists of a positive element cemented to a negative element of higher index. The astigmatism is reduced by making the index difference less than 0.05 at each cemented surface, so that the tangential and sagittal images are both very close to the Petzval surface. The eyepiece has a positive Petzval sum, and accordingly the field has a decidedly undercorrected curvature. High indices were used in the positive elements in order to improve the Petzval sum somewhat, and as low an index in the negative elements as is compatible with correction of color and astigmatism. This is all in accordance with the copending application and is fully described therein.

In regard to the image-forming system, it seemed advantageous to adopt a form comprising an objective, a positive field lens, and an erector, to change the magnification by sliding the erector as a unit, and to accommodate for the changing conjugate distances of the erector by moving the eyepiece as a unit.

The adjustment of these distances is elementary knowledge. The erector works at finite conjugates and hence at a finite magnification $m$. The optical distance from the image plane of the objective to the front principal focal plane of the erector is $f_2/m$, where $f_2$ is the focal length of the erector. The distance D from the focal plane of the objective to the focal plane of the eyepiece is given by:

$$D = f_2\left(m + \frac{1}{m}\right) + d$$

where $d$ is a constant length. The position of the eyepiece relative to the objective thus changes with the magnification, being a minimum when $m=1$. The magnifying power M of the whole telescope is then $$M = \frac{f_1}{f_3} m$$

where $f_1$ and $f_3$ are the focal lengths of the objective and the eyepiece respectively.

It can be shown that selecting the value of 5.66 for the ratio $f_1:f_3$ would have had definite advantages. To give magnifications from 4X to 8X the erector would work at magnifications from $$\frac{1}{\sqrt{2}} \text{ to } \sqrt{2}$$

the movement of the eyepiece would be a minimum, and a completely symmetrical structure of the erector could be used to give optimum definition throughout the range of movement. The mechanical limitations of the problem precluded this ideal arrangement, however, and an approximation thereto was adopted without any serious loss in quality.

The principal mechanical limitation was in regard to the size of the field lens in the focal plane of the objective. An objective focal length of 157.6 mm. was finally adopted which, with a field lens of 41 mm. diameter, provides slightly over $\pm 8°$ field at low power. With this objective the ideal ratio of $f_1/f_3 = 5.66$ would require an eyepiece of only 27.8 mm. focal length. This would be a reasonable focal length in a laboratory instrument, but for the particular war use in mind, plenty of room is needed for an eyeguard to provide protection from physical injury. No prior eyepiece covering a wide enough angle came anywhere near having a great enough eyepoint distance to be used at this focal length. Accordingly, a focal length of 36.8 mm. was chosen as best meeting the various requirements. Thus the ratio $f_1/f_3$ is 157.6/36.8 or about 4.3, and the erector has to work in the range of magnifications from $m=0.93$ to $m=1.87$ to cover the range of over-all magnifications from 4X to 8X. This arrangement involves a greater eyepiece movement than would the ideal arrangement outlined above, but on the other hand it has some compensating advantages when combined with the principles of the present invention, as will be shown presently.

In order to compensate the positive (i. e. undercorrected) Petzval sum of the eyepiece, both the objective and the erector were designed with a negative Petzval sum according to principles described in a third copending application, Serial No. 511,059, which I filed November 20, 1943, entitled "Wide-angle telescope objectives." Objectives (including erectors) of the type to which that invention relates comprise two highly meniscus negative components concave toward each other and axially aligned between two positive components, and are capable of being highly corrected, particularly as regards zonal spherical aberration, spherochromatism, Petzval sum, and curvature of field.

The compensating advantages, alluded to above, will now be readily apparent, and also certain ways in which the invention disclosed in my case on Wide-angle telescope objectives is eminently suitable for use in variable power telescopes.

As stated above, the short focal length objective relative to the eyepiece makes necessary an unsymmetrical range of magnifications of the erector and a correspondingly larger movement of the eyepiece. Compensating this is the larger negative Petzval sum of the objective due to its shorter focal length, and the smaller positive Petzval sum of the eyepiece due to its longer focal length. It is important to note that all previous types of telescope objectives have a positive Petzval sum, so that making their focal length shorter would make the positive Petzval sum worse instead of better where a beneficial effect is obtained in the present case.

Likewise in the case of the erector, all previous types have a positive Petzval sum, and in order to minimize this and also to keep the angular field of the erector within the limited capabilities of the known types, the focal length of the erector lens was often made longer than the most convenient length. It became very important then to work in a nearly symmetrical range of magnifications. This will be understood when it is remembered that the movement of the eyepiece follows the law stated above:

$$D = f_2\left(m + \frac{1}{m}\right) + d$$

$f_2$ being the focal length of the erector. Obviously, the movement of the eyepiece is directly proportional to the focal length of the erector. Consequently, while this particular embodiment of my invention loses a little mechanical convenience by working at an unsymmetrical range of magnifications, it gains in two ways, by using an erector according to my earlier invention and using as short a focal length as is mechanically convenient. First, the erector is corrected to have a negative Petzval sum, and the shorter focal length makes this greater, thus more completely correcting the system as a whole, and second, the shorter focal length results in a smaller range of movement of the eyepiece. The focal length of the erector is 110.9 mm., which is actually shorter than that of the objective.

As a result of all these factors, the Petzval sum for the whole system is only about two-thirds that of the prior fixed telescope referred to as shown in Table 6, and the net result is improved definition over that obtained with the former instrument. Thus arose the very astonishing situation of a variable power telescope intended to aid in selecting a proper magnification for a fixed power telescope turning out to be better than the fixed power telescope with which it was compared, which in turn was better than any previous fixed power telescope.

The other factor mentioned above was also of great importance in achieving this result. The type of lens chosen for use as the objective and the erector of the system was found to have very stable aberration corrections at different magnifications. This reduces to an imperceptible minimum the usual loss of sharpness upon changing magnifications.

The conditions of use require the target image to be presented to the eyepiece subject to the various magnifications produced by the erector system in changing the magnification of the telescope. It was accordingly necessary to place the reticle in the focal plane of the objective and not in the focal plane of the eyepiece, as is the more usual practice. This also led to less parallax troubles than were experienced with the former instrument, since the relayed image falling upon the reticle previously suffered from the aberrations of both the objective and the erector systems, while that in the present instrument is affected by only those of the objective system.

Figure 3:
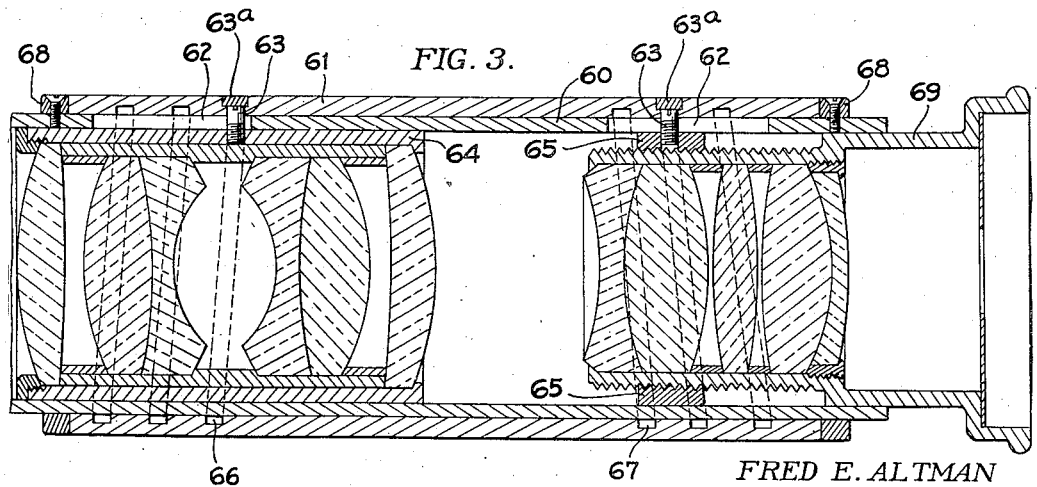
Fig. 3 shows one means of mounting the erector and eyepiece in the telescope tube.

One further detail of design may be mentioned. Working the erector through a symmetrical range of magnifications would have had further incidental advantages in that the corrections might have been even more stable over the entire range of magnifications (although they are quite satisfactorily stable as at present designed), and the erector could be made symmetrical, thus resulting in a slight saving in cost of manufacture. Even with an unsymmetrical range of magnifications an entirely symmetrical erector can be used. However, it was found, when working with a sample instrument in the testing laboratory, that some departure from complete symmetry gave better over-all performance. This dissymmetry was first introduced by altering the spacing of the elements, and a highly preferred adjustment was arrived at. A further study from a designing standpoint was made to see whether still further improvement could be made. The results of this design are shown in Fig. 3 and in Table 5. The form in which the dissymmetry is introduced entirely by altering the spacing of the elements has practically the same economy of manufacture and convenience of repair and replacements at the point of use as does the symmetrical form. It is probable that these advantages outweigh any slight gains in performance attainable by nicer adjustments of design. The added improvements due to the niceties of design just described are, however, all definitely minor compared to the main invention herein described.

Tables 1, 2, 3, and 4 are shown in the drawings and are repeated here for convenience. They give constructional data for one embodiment of the invention.

Table 1.—Objective

| EF=1.576 mm. | | | | f/4.5 |
|---|---|---|---|---|
| Lens | N | V | Radii | Thicknesses |
| I | 1.745 | 46.4 | $R_1$=+48.4 mm. $R_2$=+97.5 | $t_1$=9.1 mm. $s_1$=1.6 |
| II | 1.620 | 60.3 | $R_3$=+37.0 | $t_2$=15.1 |
| III | 1.617 | 36.6 | $R_4$=−58.7 $R_5$=+21.1 | $t_3$=6.2 $s_2$=26.3 |
| IV | 1.617 | 36.6 | $R_6$=−21.1 | $t_4$=6.2 |
| V | 1.611 | 57.2 | $R_7$=−92.6 $R_8$=−36.4 | $t_5$=15.1 $s_3$=1.0 |
| VI | 1.745 | 46.4 | $R_9$=−225.6 $R_{10}$=−65.5 | $t_6$=9.1 BF=81.8 |

Table 2.—Field lens

| EF=95.5 mm. | | | | |
|---|---|---|---|---|
| Lens | N | V | Radii | Thickness |
| VII | 1.523 | 58.6 | $R_{11}$=∞ $R_{12}$=−50.0 | $t_7$=7.5 mm. |

Table 3.—Erector

| EF=110.4 | | | | |
|---|---|---|---|---|
| Lens | N | V | Radii | Thicknesses |
| VIII | 1.611 | 57.2 | $R_{13}$=+47.3 $R_{14}$=+465 | $t_8$=8.3 $s_4$=3.1 |
| IX | 1.617 | 55.0 | $R_{15}$=+28.4 | $t_9$=13.9 |
| X | 1.617 | 36.6 | $R_{16}$=−63.4 $R_{17}$=+15.5 | $t_{10}$=5.4 $s_7$=14.4 |
| XI | 1.617 | 36.6 | $R_{18}$=−15.5 | $t_{11}$=5.4 |
| XII | 1.617 | 55.0 | $R_{19}$=+63.4 $R_{20}$=−28.4 | $t_{12}$=13.9 $s_8$=7.4 |
| XIII | 1.611 | 57.4 | $R_{21}$=−465 $R_{22}$=−47.3 | $t_{13}$=8.3 BF=38.0 |

In the first and symmetrical form of the erector, the spaces were $$s_6=6.1$$
$$s_7=13.7$$
$$s_8=6.1$$

The focal length would then be 110.8 mm.

Table 4.—Eyepiece

| Lens | N | V | Radii | Thicknesses |
|---|---|---|---|---|
| | | | EF=36.8 | |
| XIV | 1.720 | 29.3 | $R_{23}=-46.2$ | $t_{14}=4.5$ mm. |
| XV | 1.697 | 56.1 | $R_{24}=+52.2$ | $t_{15}=24.0$ |
| | | | $R_{25}=-55.5$ | $s_{10}=0.2$ |
| XVI | 1.611 | 58.8 | $R_{26}=+125.8$ | $t_{16}=10.5$ |
| | | | $R_{27}=-125.8$ | $s_{11}=0.2$ |
| XVII | 1.697 | 56.1 | $R_{28}=+80.0$ | $t_{17}=22.5$ |
| XVIII | 1.720 | 29.3 | $R_{29}=-40.5$ | $t_{18}=4.0$ |
| | | | $R_{30}=-124.8$ | |

In all these tables the refractive index N is given for the D line of the spectrum. The radii R, thicknesses t, and spaces s, are each numbered consecutively from front to rear as indicated in Figure 1.

The modified design of erector system which may be substituted for that shown above is as follows:

Table 5.—Erector

| Lens | N | V | Radii | Thicknesses |
|---|---|---|---|---|
| | | | EF=107.8 | |
| VIII | 1.611 | 57.2 | $R_{13}=+53.0$ | $t_8=8.3$ |
| | | | $R_{14}=-3960$ | $s_6=4.0$ |
| IX | 1.617 | 55.0 | $R_{15}=+28.4$ | $t_9=13.9$ |
| X | 1.617 | 36.6 | $R_{16}=-63.4$ | $t_{10}=5.4$ |
| | | | $R_{17}=+15.5$ | $s_7=13.7$ |
| XI | 1.617 | 36.6 | $R_{18}=-15.5$ | $t_{11}=5.4$ |
| XII | 1.617 | 55.0 | $R_{19}=+63.4$ | $t_{12}=13.9$ |
| | | | $R_{20}=-28.4$ | $s_8=4.0$ |
| XIII | 1.611 | 57.2 | $R_{21}=-223.0$ | $t_{13}=8.3$ |
| | | | $R_{22}=-43.0$ | $BF=43.5$ |

The front focal length of this alternative erector is 40.7 mm.

These lenses are also suitable for use as a fixed magnification telescope of very high quality at any magnification from about 4X to about 8X and at lower magnifications if the erector is reversed. A direct comparison between the Petzval corrections in the present example and that in the telescope already mentioned is given by Table 6.

Table 6

| Name of lens group | Petzval contribution | |
|---|---|---|
| | Variable power | Prior fixed power |
| Objective | −0.00632 | −0.01019 |
| Field lens | +0.00687 | +0.00708 |
| Erector | −0.00785 | −0.00109 |
| Eyepiece | +0.01366 | +0.01366 |
| Entire system | +0.00636 | +0.00946 |

One suitable form of mounting is shown in Fig. 3. The telescope tube 60 is surrounded by an adjusting sleeve 61 and is provided with two longitudinal slots 62 through which extend two pins 63 which are screwed firmly into the erector mount 64 in the one case and the eyepiece focusing ring 65 in the other. The adjusting sleeve 61 is provided on its inner face with two helical grooves 66 and 67 into which the two pins 63 extend. The two helical grooves are pitched in opposite directions. One of them 66 may have uniform pitch, but non-linear motion must be provided for either by making the other helical groove 67 non-uniform in pitch, as shown, or by making at least one of the slots 62 curved. The adjusting sleeve is held in position by end rings 68. The eyepiece mount 69 is threaded into the focusing ring 65 to provide for separate focusing of the eyepiece by turning its mount. The lens elements are held in their mounts in any known manner. Two plugs 63a are useful in assembling the instrument.

For simplicity in drawings, the helical grooves 66 and 67 are not shown exactly in conformity with the erector cam and eyepiece cam slopes shown in Fig. 2 as they must be in actual practice of course. Also, the thickness of the several sleeves in Fig. 3 are exaggerated for the sake of clarity.

I claim:

1. A variable power sighting telescope comprising an image-forming system for forming an image of the object being sighted and an eyepiece system with a positive Petzval sum for viewing said image, of which the image-forming system comprises a first objective for forming a primary image in its rear focal plane, a field lens substantially in the rear focal plane of the objective, and a relay objective working at finite conjugates and movable in an axial direction for varying the magnification for relaying the primary image from said rear focal plane to the eyepiece image plane, characterized by the image-forming system having a negative Petzval sum and having sagittal and tangential field curvatures substantially matching those of the eyepiece system, said eyepiece system consisting of at least four elements composing at least two components and at least one of said first objective and said relay objective having at least eight refracting surfaces.

2. A variable power telescope as claimed in claim 1 in which the relay objective and the eyepiece are axially movable in a coordinated manner whereby the system is maintained in focus while the magnification is changed.

3. A telescope according to claim 1 in which the image-forming system has an overcorrected curvature of field and the eyepiece has a substantially matching undercorrected curvature of field.

4. A telescope according to claim 1 in which at least one of the two objectives is of the type comprising two highly meniscus negative components concave toward a central airspace therebetween and axially aligned between two positive components the outer of whose two bounding surfaces is in each case the more strongly curved, at least one component on each side of the central airspace being compound.

5. A telescope as claimed in claim 1 in which the first objective and the relay objective each are of the type comprising two highly meniscus negative components concave toward a central airspace therebetween and axially aligned between two positive components the outer of whose two bounding surfaces is in each case the more strongly curved, at least one component on each side of the central airspace being compound.

FRED E. ALTMAN.